United States Patent Office 3,657,361
Patented Apr. 18, 1972

3,657,361
PREPARATION OF MAGNESIUM ALCOHOLATES
Arnold Lenz, Stammheim, Otto Bleh, Bergheim, and Erich Termin, Niederkassel, Germany, assignors to Dynamit Nobel Aktiengesellschaft
No Drawing. Filed Oct. 30, 1969, Ser. No. 872,751
Claims priority, application Germany, Nov. 2, 1968,
P 18 06 549.1
Int. Cl. C07c 31/30, 43/04
U.S. Cl. 260—615 R                5 Claims

ABSTRACT OF THE DISCLOSURE

Compounds of the formula $Mg(OR)_2 \cdot (ROH)_n$ are prepared by first pretreating the alcohol, ROH, with the orthoformic acid ester of that alcohol, and then reacting metallic magnesium with the pretreated alcohol. p-Toluenesulfonic acid may additionally be used to pretreat the alcohol.

PRIOR ART

Magnesium alcoholates are used as mild neutralizing agents in non-aqueous systems, as catalysts for the condensation of carbonyl compounds, e.g., after the principle of the Tischtschenko reaction, as polymerization catalysts, as starting materials for the manufacture of pure magnesium oxide, and as chemical intermediates. In view of this importance of the magnesium alcoholates, there has been a demand for the development of methods by which these alcoholates can be manufactured in a rational and technically advantageous manner.

In methods practiced hitherto for the preparation of magnesium alcoholates, two stages have been used. In the first stage the desired alcohol is first added to magnesium chips. For this purpose, however, it is necessary that the magnesium chips first be activated by the addition of iodine or other halogens, $HgCl_2$, $SnCl_4$, trichlorethylene, perchlorethylene or other low aliphatic chlorinated hydrocarbons, inorganic halogen compounds, or other such substances.

A disadvantageous result is that undesired byproducts, such as mercury, halides, magnesium hydroxide, and the like, form during the activation. These undissolved byproducts are very troublesome because they are extremely difficult to separate by filtration. If it is desired to achieve a pure end product, it is possible to do so only by using a sufficiently great excess of alcohol, and by separating the undesired precipitates from the alcoholate solution thus prepared, as by decantation. This first step of the process is very time-consuming, because successful decantation can be accomplished only after a settling time of at least 10 hours. Since magnesium alcoholates are only poorly soluble in the alcohols and also in organic solvents, a considerable quantity of alcohol or solvent is also necessary in order to assure solution of the alcoholate.

If technical alcohols are used in this known procedure, having moisture contents of more than about 0.1 to 0.5 percent by weight, no reaction at all develops in the activation of the magnesium.

This first stage is followed by the second stage, which is the extraction of the magnesium alcoholate solution. This second step is uneconomic, because the excess amounts of alcohol that were added in the first step have to be removed by distillation.

An uncertainty is also created in this conventional process to the extent that it often happens, in the case of the preparation of magnesium methylate, for example, that during the settling period prior to the decantation, even when there is an excess of alcohol in which saturation with the alcoholate has not yet come about, a magnesium-alcohol compound of the formula $$Mg(OCH_3)_2 \cdot 3CH_3OH$$

precipitates. Due to the formation of such crystals, alcohol solvent is removed from the system, thereby further accelerating this crystallization. The components that have thus been taken out by crystallization are then lost to production, because they are separated by the decantation together with the undesired byproducts. This uncertainty can be remedied only by operating in such dilution that approximately 5 percent magnesium methylate solutions are produced in the first stage.

The prior-art process described above is particularly disadvantageous in the case of the preparation of magnesium ethylate. The solubility of the magnesium ethylate in ethyl alcohol amounts to only about 1 percent by weight. It is therefore necessary to operate in a great dilution. Furthermore, higher temperatures are necessary, which can be brought about either by pressure increase or by the addition of high-boiling solvents such as toluene or xylene. This, of course, means greater technical expense and greater precautions against the danger of explosion. If solvents are added, they have to be separated again later on by expensive distillation processes. Another disadvantage to be pointed out is that residues of such high-boiling solvents are stubbornly retained in the end product and can be removed only with difficulty.

Also unfavorable are other known methods of preparing magnesium ethylate, in which ethanol vapors are passed through magnesium chips at high temperatures, or magnesium amalgam is used instead of magnesium.

THIS INVENTION

This invention is a method of preparing magnesium alcohol compounds of the general formula $$Mg(OR)_2 \cdot (ROH)_n$$

wherein: $n$ is a number from 0 to 3, preferably 0 or 3, and R is an alkyl radical having 1 to 3 carbon atoms or a radical of the general formula —$R^1$—O—$R^2$ wherein $R^1$ is an alkylene radical and $R^2$ is an alkyl radical, with $R^1$ and $R^2$ having a total of 3 to 4 carbon atoms. These compounds are produced by the reaction of metallic magnesium, preferably in comminuted form, such as chips, powders or granules, with the alcohol of the formula ROH in excess, at temperatures between 20 and 140° C., preferably at a temperature between about 15° C. below the boiling point of the alcohol involved and the boiling point of the alcohol, and at pressures between 200 Torr and 10 atmospheres gauge pressure, preferably at atmospheric pressure, followed, if desired, by partial or complete evaporation of the excess alcohol.

This process is characterized by the fact that 0.5 to 5 weight percent of an orthoformic acid ester, preferably one of the alcohol used, and in some cases 0.001 to 0.005 weight percent of p-toluenesulfonic acid (both percentages being based on the quantity of the alcohol) are added to the alcohol involved prior to the reaction, and the mixture thus formed is heated for 15 minutes to 24 hours at a temperature of about 15 to 200° C., preferably at the boiling temperature of the alcohol involved, prior to the introduction of the magnesium.

DISCUSSION

Methanol, ethanol, propanol and isopropanol are the alcohols used in this process. However, the hydroxyethers with 3 and 4 carbon atoms are also usable as reaction alcohols, i.e., ethylene glycol monoethyl ether and ethylene glycol monomethyl ether.

If the addition of the orthoformic acid ester to the alcohol and the following treatment are performed at room temperature, an exposure time of several hours, up to a maximum of 24 hours, is necessary. If, however, the process is performed at the boiling point of the alcohol— the methanol for instance—a treatment time of about 15 minutes suffices. In many cases the addition of p-toluenesulfonic acid has proven advantages. This substance has the effect of reducing the time required for the pretreatment of the alcohol, especially in the preparation of magnesium ethyl ether.

In contrast to the prior-art procedures, in the reaction of the alcohol with the magnesium according to the invention, it is preferred to operate at normal pressure and at a temperature between about 15° C. below the boiling point of the alcohol and its boiling point. However, higher and lower pressures, say between 200 Torr and 10 atmospheres gauge pressure, and temperatures between 20 and 140° C., can be used.

The magnesium is introduced continuously or portion by portion, preferably in the form of chips or granules. The lengths and widths of the chips should amount to about 5 to 40 mm., and their thickness should amount to about 0.1 to 1.0 mm. When granulated magnesium is used, The grain size should range from about 0.1 to 2 mm. It is preferable to at first add about one tenth of the entire quantity of the magnesium in order to start the reaction. The rate at which the rest is added depends on the intensity of the reaction and the turbulence in the reaction vessel. After the addition of the magnesium and the dissolution of it is complete, the cooking is customarily continued for another 30 minutes to 3 hours.

A special advantage of the process of the invention is that the alcoholate can be produced in concentrated solution and in solid form suspended in the alcohol. In other words, it is not necessary that the alcoholate be dissolved, because the decantation process is eliminated. This means that much less alcohol has to be added from the outset. Thus it is sufficient that, in the mixtures prepared for the process of the invention the alcohol involved be present in a slight excess of the stoichiometric amount. The quantity of the alcohol, however, must be sufficient to permit stirring after the reaction has taken place. Lastly, on account of this comparatively smaller amount of alcohol, the very tedious and expensive second stage of the prior-art process is eliminated, i.e., the distillation of the great amount of solvent alcohol. The elimination of the decantation especially represents a great saving of time, since the long settling period is eliminated. Furthermore, there can be no decantation losses.

The magnesium-alcohol compounds prepared according to the invention are magnesium alcoholates and the alcohol adducts of same. The magnesium alcoholates correspond to the general formula $Mg(OR)_2 \cdot (ROH)_n$ when $n$ is equal to 0, and the magnesium alcoholate-alcohol adducts correspond to this formula when $n$ is equal to from 1 to 3, preferably 3.

Surprisingly, the products prepared according to the invention, in spite of the single-stage procedure and in spite of the high concentration ratios, are free of impurities. Such impurities usually occur in the form of a suspension in the corresponding alcohol. The crystallizate product is the magnesium alcoholate plus small amounts of alcohol adduct of the magnesium alcoholate. The alcoholate and adduct are in equilibrium, which in the course of time shift towards the adduct, especially when the suspension is concentrated. Such concentration is often necessary whenever definite slurries, i.e., concentrated suspensions are needed for special applications. The concentrated suspension of crystals that is produced is free of formic acid esters. The monoformic acid ester, which can occur in small amounts as a byproduct, passes over in the distillation before the alcohol involved passes over. Small amounts of any orthoformic acid ester that may still be present are removed in the course of the distillation by the greater quantities of alcohol.

The suspension ordinarily produced by the process of the invention can, however, be transformed to a solution of the magnesium alcoholate in the alcohol in question if this is desired, by thinning it by the addition of the alcohol.

Often, however, it will be necessary to isolate either the solid magnesium alcoholate-alcohol adduct or the solid magnesium alcoholate. In the former case it is only necessary to evaporate the excess alcohol away under mild conditions. The evaporation can therefore be performed at a vacuum, usually not greater than 50 Torr, and at temperatures between about 10 and 50° C., especially at the end of the distillation. In the latter case to recover the alcoholate forced conditions must be applied in the distillation so that the adduct alcohol molecules will be split off. It is therefore necessary to use temperatures between about 60° C. and 230° C., while maintaining pressures of about 20 Torr to 3 atmospheres gauge.

A particular product of this invention is the magnesium-alcohol compound of the formula $$Mg(OCH_3)_2 \cdot 3CH_3OH$$

This substance is a methanol adduct of magnesium methylate. It is characterized by a decomposition point at normal pressure of about 60° C. At this temperature the adduct is cleaved back again, i.e., 3 moles of methanol come out for every mole of the adduct. The decomposition starts at lower temperatures when the product is exposed to lower pressures. For example, at a pressure of 200 Torr the methanol is split off at a temperature of only about 50° C. This particular adduct is according to this invention, well suited for use as a catalyst and intermediate product on account of its low molecular weight and its relatively good solubility in many organic solvents.

EXAMPLES

Example 1

In a 2-liter four-necked flask purged with dry nitrogen and equipped with a reflux condenser, stirrer, gas feed tube and filler connection, 1 liter of technical methanol is placed with the continued introduction of nitrogen. After the addition of 7 g. of trimethyl orthoformate, the mixture was heated at ebullition for 1½ hours with refluxing. Then, over a period of about 30 minutes, 50 g. of (non-activated) magnesium chips were added, whereupon a reaction temperature of 40 to 50° C. established itself. The hydrogen that evolved escaped with the nitrogen through the reflux condenser. After the reaction ceased, the mixture was heated for another half hour at the boiling point, and then the nitrogen feed was shut off and the excess alcohol was removed by distillation first at normal pressure and then at a pressure of 20 Torr. A bath temperature of 100° C. was necessary for this purpose. Solid magnesium methylate remained as the end product. The yield amounted to 176 g., that is 99 percent of the theory with reference to the Mg input.

In an experiment performed by the process according to the state of the art (without the addition of formate and with the activation of the magnesium by $HgCl_2$) the yield amounted to 174 g., which is 98 percent of the theory with reference to the Mg input.

An analysis of the two products show the following differences:

|  | Mg content (weight percent) | $Mg(OH)_2$ content (weight percent) | Halogen ($AgNO_3$ method) | Mercury (spark spectrograph) |
|---|---|---|---|---|
| According to the invention. | 28.04 | Traces | Negative | Negative. |
| Prior-art process | 28.30 |  | 0.8 Positive | Positive. |
| Theoretical value | 28.16 |  |  |  |

The weight percentages relate to the solid end product.

Example 2

The procedure was the same as in Example 1, except that a methanol containing more water (10 g./l.) was used instead of technical methanol, a quantity of 100 g. of trimethyl orthoformic acid ester was used instead of 7 g., and the heating at ebullition was performed for 4–5 hours instead of 1½ hours, with refluxing. In this procedure, too, the reaction started immediately upon the addition of the magnesium chips, and continued to the end as described in Example 1. After the extraction of the magnesium methylate the following analysis values were determined: Mg content: 27.18 weight percent; $Mg(OH)_2$ content: 0.08 weight percent; halogen test: negative.

If, however, the process was performed without the addition of trimethyl orthoformic acid ester, but magnesium (chips) activated with elemental iodine was used, the reaction did not start at all, even after heating to ebullition.

Example 3

The same procedure was followed as in Example 1. The suspension that was produced containing the magnesium alcohol compounds was concentrated at a pressure of 20 mm. Hg and a bath temperature of 30° C. until the magnesium content of the suspension had reached a value of 7 percent by weight. The solid substance in the slurry thus obtained was substantially an addition product of the formula $Mg(OCH_3)_2 \cdot 3CH_3OH$. Results of the analysis of the suspension: Mg content: 7.2 weight percent. Tests for $Mg(OH)_2$ and halogens: negative.

Example 4

The procedure was the same as in Example 3, except that, after the reaction had ended, and after the half hour of refluxing, the suspension was kept at room temperature for another 5 hours with stirring. Then it was evaporated to the dry state at a bath temperature of a maximum of 50° C. and at a pressure between about 3 and 20 mm. Hg. A white product was the final result, which was identified as $Mg(OCH_3)_2 \cdot 3CH_3OH$. The yield was 380 g., which is 100 percent of the theory.

*Analysis.*—Mg content 13.15 weight percent (theoretical content 13.25 weight percent): $Mg(OH)_2$ content: 0.04 weight percent; halogen test: negative.

Example 5

In a kettle equipped with a stirrer, 200 g. of triethyl orthoformate were added to 12.6 kg. of ethanol. The mixture was let stand for 20 hours. Then 0.1 g. of p-toluenesulfonic acid was added and finally the mixture was heated at ebullition for 2 hours. Over a period of 90 minutes, 800 g. of Mg chips were added in 4 portions of about 200 g. each, while the mixture was kept at ebullition. After the last batch of Mg had been added, boiling was continued until the evolution of hydrogen, and hence the reaction, had ended. Then the ethanol was distilled off, first at normal pressure, and then at a pressure of 200 mm. Hg and a temperature of about 120° C., until the kettle contained solid magnesium ethylate. The yield was 3.6 kg. This is 96 percent of the theory, with reference to the magnesium input.

*Analysis.*—Mg content: 21.4 weight percent (theoretically 21.3 weight percent): $Mg(OH)_2$ content: 0.16 weight percent; halogen test: negative; organic foreign substances: negative.

Example 6

In the apparatus used in Example 1, 10 g. of triethyl orthoformic acid ester were added to 230 g. of technical ethylene glycol monoethyl ether. The mixture was then refluxed for several hours. 5 g. of non-activated magnesium chips were added and heating was continued at ebullition. After about 3 hours the reaction started and the magnesium was rapidly dissolved. Additional portions of Mg were added, which also reacted successively. After a total of 20 g. of magnesium had been added, a suspension was obtained in the ethylene glycol monoethyl ether containing 67 weight percent of a solid product containing magnesium. The solid product of this suspension consisted substantially of the alcoholate of the formula $$Mg(OC_2H_4OC_2H_5)_2$$

It contained, however, small amounts of the adduct of the formula $Mg(OC_2H_4OC_2H_5)_2 \cdot (C_2H_5OC_2H_4OH)_3$. The excess ether was removed in vacuo. The solid product obtained was then substantially the corresponding alcoholate, and it contains no foreign metals nor any impurities in the form of $Mg(OH)_2$ or $MgCO_3$.

We claim:

1. In the method of preparing a compound of the formula:

$$Mg(OR)_2 \cdot (ROH)_n$$

wherein:

$n$ is 0 or 3, and

R is an alkyl radical having 1 to 3 carbon atoms, or is a radical of the formula: $-R^1-O-R^2$, wherein $R^1$ and $R^2$ have a total of 3 to 4 carbon atoms, and $R^1$ is an alkylene radical and $R^2$ is an alkyl radical, by the reaction of metallic magnesium with a stoichiometric excess of an alcohol of the formula ROH; the improvement comprising: first admixing in the range of 0.5 to 5 weight percent of the orthoformic acid ester of said alcohol with said alcohol and heating the resulting mixture for in the range of ¼ to 24 hours at a temperature in the range of 15° to 200° C., and thereafter introducing said metallic magnesium in comminuted form to said mixture.

2. The method of claim 1 wherein in the range of 0.001 to 0.005 weight percent of p-toluenesulfonic acid is also added to said alcohol along with said orthoformic acid ester.

3. The method of claim 1 where said heating is carried out at a temperature of from 15° C. below the boiling point of said alcohol to said boiling point.

4. The method of claim 1 wherein excess alcohol is distilled off after the reaction is completed at a temperature in the range of 10° to 50° C. and a pressure of less than 50 Torr.

5. The method of claim 1 wherein excess alcohol is distilled off after the reaction is completed at a temperature in the range of 60° to 230° C. and at a pressure in the range of 20 Torr. to 3 p.s.i.g., until the crystallizate is dry.

References Cited

UNITED STATES PATENTS

| | | | |
|---|---|---|---|
| 2,570,058 | 10/1951 | Hunter | 260—632 A |
| 2,593,314 | 4/1952 | Kimberlin | 260—632 A |
| 2,610,982 | 9/1952 | Hutcheson | 260—632 A |
| 2,965,663 | 12/1960 | Smith et al. | 260—632 A |

OTHER REFERENCES

Turova et al.: "Russian Chemical Reviews" (1965), pp. 161 to 172, 181, 183.

LEON ZITVER, Primary Examiner

J. E. EVANS, Assistant Examiner

U.S. Cl X.R.

260—632 A